US008838433B2

(12) United States Patent
Axelrod et al.

(10) Patent No.: US 8,838,433 B2
(45) Date of Patent: Sep. 16, 2014

(54) SELECTION OF DOMAIN-ADAPTED TRANSLATION SUBCORPORA

(75) Inventors: Amittai Axelrod, Seattle, WA (US); Jianfeng Gao, Kirkland, WA (US); Xiaodong He, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 13/022,633

(22) Filed: Feb. 8, 2011

(65) Prior Publication Data
US 2012/0203539 A1 Aug. 9, 2012

(51) Int. Cl.
*G06F 17/28* (2006.01)
(52) U.S. Cl.
CPC ................ *G06F 17/2809* (2013.01)
USPC ........................ 704/2; 704/256.3; 704/277
(58) Field of Classification Search
CPC . G06F 17/28; G06F 17/2809; G06F 17/2818; G06F 17/2836
USPC ........................ 704/2, 8, 256.3, 277
See application file for complete search history.

(56) References Cited

U.S. PATENT DOCUMENTS

| 6,188,976 | B1 * | 2/2001 | Ramaswamy et al. ............ 704/9 |
| 6,397,205 | B1 * | 5/2002 | Juola |
| 7,254,529 | B2 | 8/2007 | Gao et al. |
| 7,340,388 | B2 | 3/2008 | Soricut et al. |
| 7,478,038 | B2 | 1/2009 | Chelba et al. |
| 7,624,020 | B2 * | 11/2009 | Yamada et al. ................ 704/277 |
| 7,752,034 | B2 * | 7/2010 | Brockett et al. .................. 704/9 |
| 8,296,127 | B2 * | 10/2012 | Marcu et al. ....................... 704/5 |
| 8,423,546 | B2 * | 4/2013 | Gherman et al. ............. 707/736 |
| 8,442,813 | B1 * | 5/2013 | Popat ................................ 704/9 |
| 8,478,597 | B2 * | 7/2013 | Higgins et al. ................ 704/270 |
| 8,527,534 | B2 * | 9/2013 | Wang et al. ................... 707/769 |
| 8,612,212 | B2 * | 12/2013 | Riccardi ........................... 704/9 |
| 2004/0260532 | A1 | 12/2004 | Richardson et al. |
| 2005/0228643 | A1 * | 10/2005 | Munteanu et al. ................ 704/9 |
| 2006/0282255 | A1 | 12/2006 | Lu et al. |
| 2007/0043553 | A1 * | 2/2007 | Dolan ............................... 704/2 |
| 2007/0203690 | A1 | 8/2007 | Wang et al. |
| 2008/0126094 | A1 * | 5/2008 | Janke et al. ................... 704/255 |
| 2009/0112573 | A1 | 4/2009 | He |

(Continued)

OTHER PUBLICATIONS

Iyer, et al., "Using Out-of-Domain Data to Improve In-Domain Language Models", Retrieved at << http://www.it.iitb.ac.in/~amogha/papers/domain/using-out-of-domain-to-improve-in-domain-language-models.pdf >>, IEEE Signal Processing Letters, vol. 4, No. 8, Aug. 1997.

(Continued)

*Primary Examiner* — Martin Lerner
(74) *Attorney, Agent, or Firm* — Judy Yee; Sandy Swain; Micky Minhas

(57) ABSTRACT

An architecture is discussed that provides the capability to subselect the most relevant data from an out-domain corpus to use either in isolation or in combination conjunction with in-domain data. The architecture is a domain adaptation for machine translation that selects the most relevant sentences from a larger general-domain corpus of parallel translated sentences. The methods for selecting the data include monolingual cross-entropy measure, monolingual cross-entropy difference, bilingual cross entropy, and bilingual cross-entropy difference. A translation model is trained on both the in-domain data and an out-domain subset, and the models can be interpolated together to boost performance on in-domain translation tasks.

20 Claims, 8 Drawing Sheets

(56) References Cited

U.S. PATENT DOCUMENTS

| | | |
|---|---|---|
| 2009/0164206 A1 | 6/2009 | Zhanyi et al. |
| 2009/0276414 A1 | 11/2009 | Gao et al. |
| 2010/0070262 A1 | 3/2010 | Udupa et al. |
| 2010/0070521 A1 | 3/2010 | Clinchant et al. |
| 2012/0143860 A1* | 6/2012 | Gherman et al. ............ 707/727 |
| 2013/0018650 A1* | 1/2013 | Moore et al. ..................... 704/9 |
| 2013/0185059 A1* | 7/2013 | Riccardi .......................... 704/9 |
| 2013/0185074 A1* | 7/2013 | Gruber et al. ................ 704/257 |
| 2013/0185081 A1* | 7/2013 | Cheyer et al. ................ 704/275 |

OTHER PUBLICATIONS

Mustapha, et al., "Corpus-Based Analysis on Cross-Domain Experiments in Classification-and-Ranking Generation", Retrieved at << http://www.scipub.org/fulltext/jcs/jcs6111326-1333.pdf >>, Journal of Computer Science, vol. 6 No. 11, 2010.

Doi, et al., "Adaptation Using Out-of-Domain Corpus within EBMT", Retrieved at << http://www.ldc.upenn.edu/acl/N/N03/N03-2006.pdf >>, Proceedings of the Conference of the North American Chapter of the Association for Computational Linguistics on Human Language Technology: companion volume of the Proceedings of HLT-NAACL-short papers—vol. 2, 2003.

* cited by examiner

# US 8,838,433 B2

SELECTION OF DOMAIN-ADAPTED TRANSLATION SUBCORPORA

BACKGROUND

Oftentimes, there is a lack of sufficient relevant data upon which to train translation systems for particular tasks—there is a small amount of in-domain data and a large amount of general or non-in-domain data (also referred to as out-domain data). Using a subset of relevant data from the general domain (or a combination of the in-domain data and the relevant subset from the out-domain domain) improves performance over using either corpus individually, but a large portion of that out-domain data is at best irrelevant, and at worst, harmful, in that the out-domain data does not accurately represent the target domain.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture provides the capability to subselect the most relevant out-domain data from an out-domain corpus to use either in isolation or in combination conjunction with in-domain data. The architecture is a domain adaptation for machine translation that selects the most relevant sentences from a large out-domain corpus of parallel translated sentences. The methods for selecting the out-domain data include using similarity measures such as monolingual cross-entropy, monolingual cross-entropy difference, bilingual cross entropy, and bilingual cross-entropy difference. In one implementation, a translation model is trained on both the in-domain data and the selected subset from the out-domain data, and the models are interpolated together to boost performance on in-domain translation tasks. An alternative way of using the selected out-domain data includes, but is not limited to, training a model only using the out-domain data and then interpolating the model, with the model trained only using in-domain data.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
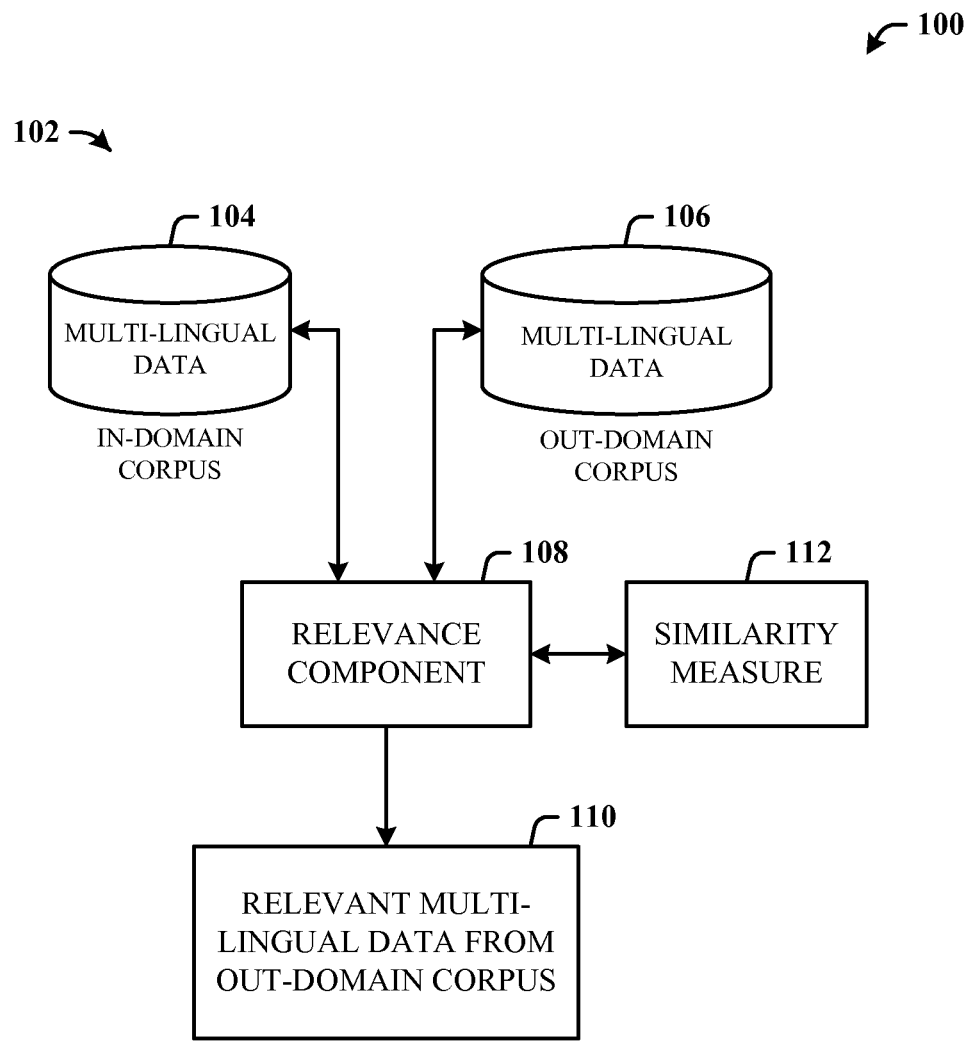
FIG. 1 illustrates a computer-implemented selection system in accordance with the disclosed architecture.

The disclosed architecture is a strategy of domain adaptation for machine translation that selects the most relevant sentences from a larger out-domain corpus of parallel translated sentences. This produces significantly smaller and faster translation models with identical and/or improved performance.

Multi-lingual parallel sentence similarity metrics are disclosed for selecting the relevant data from the out-domain corpus, and include the following: monolingual cross-entropy, monolingual cross-entropy difference, bilingual cross entropy, and bilingual cross-entropy difference. A translation model can be trained on both the in-domain corpus data and the selected subset of the out-domain corpus. The models are then interpolated together to boost performance on in-domain translation tasks. Alternatively, the translation model can be trained using the out-domain data and then interpolating the model, with the model trained only using in-domain data. Moreover, multiple translation models can be used in a translation system, such as a model obtained above plus another translation model built solely on in-domain corpus (and plus another translation model built solely on an out-domain corpus, etc.).

The selection strategies for identifying the most relevant subset of the out-domain bilingual data include ranking the individual sentences, and then applying to the task of domain adaptation for machine translation. The varying aspects include ranking sentences by the combination of the difference of cross-entropy scores according to an in-domain language model and an out-domain language model on each of the source and target sides, ranking sentences by the combination of cross-entropy scores according to an in-domain language model on each of the source and target sides, ranking sentences by the difference of the cross-entropy score according to an in-domain language model and the cross-entropy score according to an out-domain language model, and ranking sentences by cross-entropy score according to an in-domain language model.

The bilingual cross-entropy difference can be represented as, $$[H_{in\_src}(s) - H_{out\_src}(s)] + [H_{in\_tgt}(s) - H_{out\_tgt}(s)],$$

where s is a string, $H_{in\_src}(s)$ is the source side in-domain language model, $H_{out\_src}(s)$ is the source side out-domain language model, $H_{in\_tgt}(s)$ is the target side in-domain language model, and $H_{out\_tgt}(s)$ is the target side out-domain language model. The intuition is to select sentences that both of their source side (input), and the target side (translation) sentences match the in-domain data.

The disclosed architecture extends conventional techniques in several ways: 1) in the context of bilingual data, 2) ranking and scoring methods are used on either the source-side language and/or target-side language, and 3) bilingual sentence pairs are selected from the out-domain corpus. Using this subset of the data from the out-domain corpus, translation models are trained that are just as effective as the translation models trained on the original in-domain and out-domain models together, yet are a tiny fraction of the size.

When extending data selection methods to include bilingual cross-entropy difference, the cross-entropy difference scores of both the source and target languages can be combined. The combination may be done via simple addition, and/or via a tuned parameter weighted sum, for example. This selects a subset of the out-domain corpus that more closely matches both the source side and target side of the in-domain data. Thus, the translation model trained from the subselected out-domain data is closer to the in-domain model. For example, a very general formulation for similarity measure could be: $Wgt_{in\_src}*H_{in\_src}(s)-Wgt_{out\_src}*H_{out\_src}(s)+Wgt_{in\_tgt}*H_{in\_tgt}(s)-Wgt_{out\_tgt}*H_{out\_tgt}(s)$, where the set of weights {Wgt} can take a real value (positive or negative), which can be tuned on a development set. Note that the previous cross-entropy is a special case of this general measure.

Additionally, interpolation is to both the original in-domain model and the new model trained on a subset of the out-domain data. Thus, all original knowledge of the domain of interest is retained, and the new combined model always has greater coverage than the original.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a computer-implemented selection system 100 in accordance with the disclosed architecture. The system 100 includes linguistic data corpora 102 that include an in-domain corpus 104 and an out-domain corpus 106 for domain adaptation for machine translation model training. The in-domain corpus 104 and a out-domain corpus 106 include multi-lingual data translated to the corpora 102 in parallel. A relevance component 108 selects relevant multi-lingual data 110 from the out-domain corpus 106 based on a similarity measure 112. The relevant multi-lingual data 110 can be utilized in combination with the in-domain corpus 104 or in isolation without the in-domain corpus (e.g., only in combination with the out-domain corpus 106).

The relevant multi-lingual data 110 can be selected based on the similarity measure 112 (e.g., cross-entropy), which considers a difference of cross-entropy scores according to an in-domain language model and an out-domain language model on a source side and/or a target side. The relevant multi-lingual data 110 can be selected based on the similarity measure 112, which combines cross-entropy scores according to an in-domain language model on each of the source side and the target side.

The relevant multi-lingual data 110 can be selected based on the similarity measure 112, which considers a difference of the cross-entropy score according to an in-domain language model and cross-entropy score according to an general domain language model. The relevant multi-lingual data 110 can be selected based on the similarity measure 112, which is a cross-entropy score according to an in-domain language model.

The multi-lingual data are sentences that can be ranked based on the similarity measure 112 for selection as the relevant multi-lingual data. The selection can be based on ranking and scoring (e.g., cross-entropy) techniques that are applied to at least one of a source side language or a target side language, and bilingual sentence pairs are selected from the out-domain corpus 106.

Figure 2:
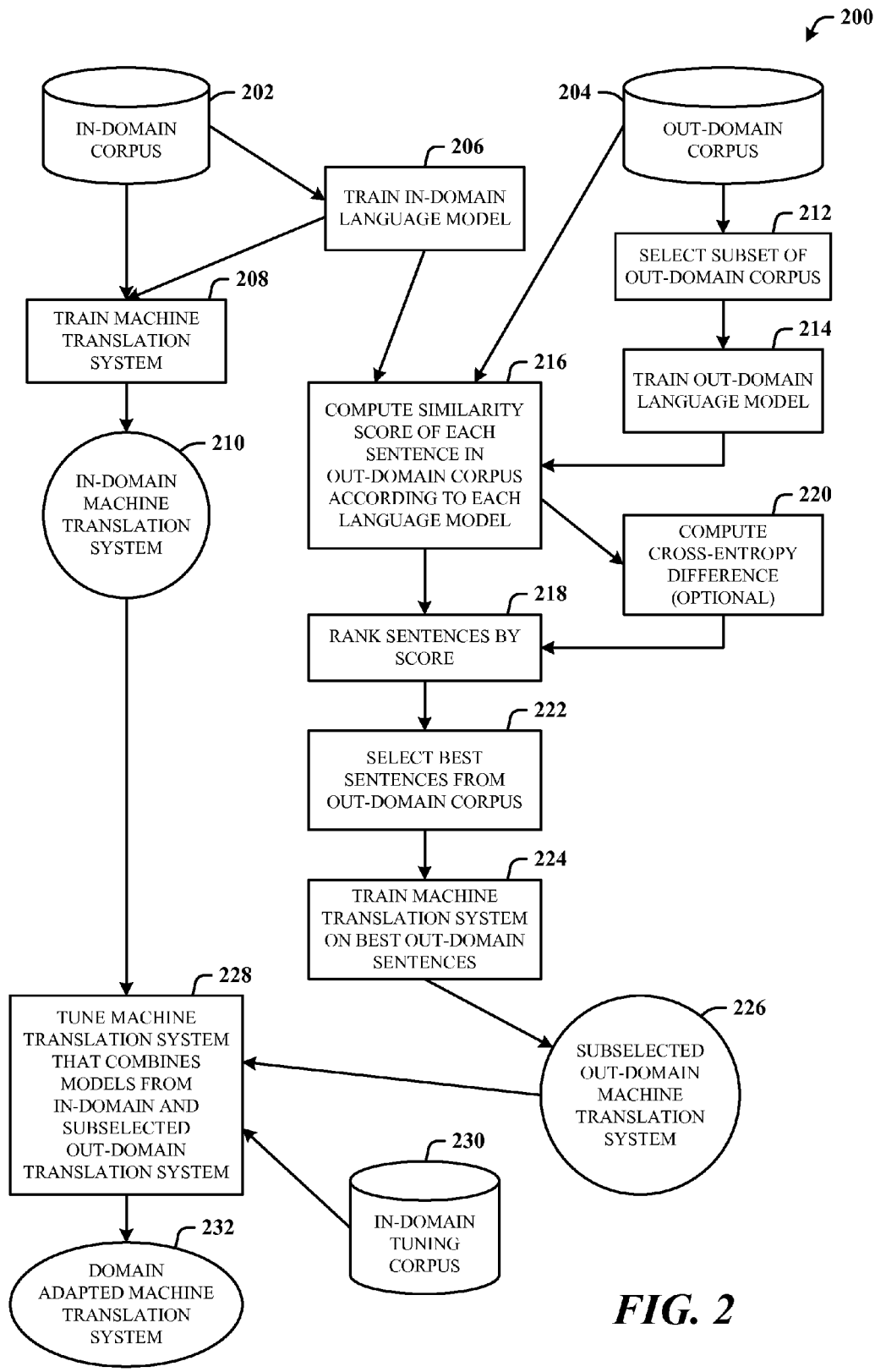
FIG. 2 illustrates a flow diagram for selecting domain adapted translation subcorpora.

FIG. 2 illustrates a flow diagram 200 for selecting domain adapted translation subcorpora. The diagram 200 begins with an in-domain corpus 202 (similar to in-domain corpus 104) and an out-domain corpus 204 (similar to out-domain corpus 106). At 206, the in-domain corpus 202 is used to train an in-domain language model. The in-domain corpus 202 is also used as input to train a machine translation system, as indicated at 208, the output of which is then an in-domain machine translation system, at 210. A subset of the out-domain corpus 204 is selected, as indicated at 212, and used to train an out-domain language model, as indicated at 214.

The in-domain language model, the out-domain language model, and the out-domain corpus are then used as inputs to compute a similarity score (e.g., cross entropy) of each sentence in the out-domain according to each language model, as indicated at 216. The similarity scores are then used to rank the sentences by score (at 218), and optionally, compute a cross-entropy difference data (at 220). The cross-entropy difference data can then also be used to rank the sentences (at 218). The best sentences are then selected from the out-domain corpus (at 222). The best out-domain sentences are then used to train the machine translation system, as indicated at 224, which results in a subselected out-domain machine translation system (at 226). A tuning process (at 228) can then be performed that combines models from the in-domain translation system (at 210) and subselected out-domain translation system (at 226), and can further utilize an in-domain tuning corpus (at 230). The resulting system is a domain adapted machine translation model training system (at 232).

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
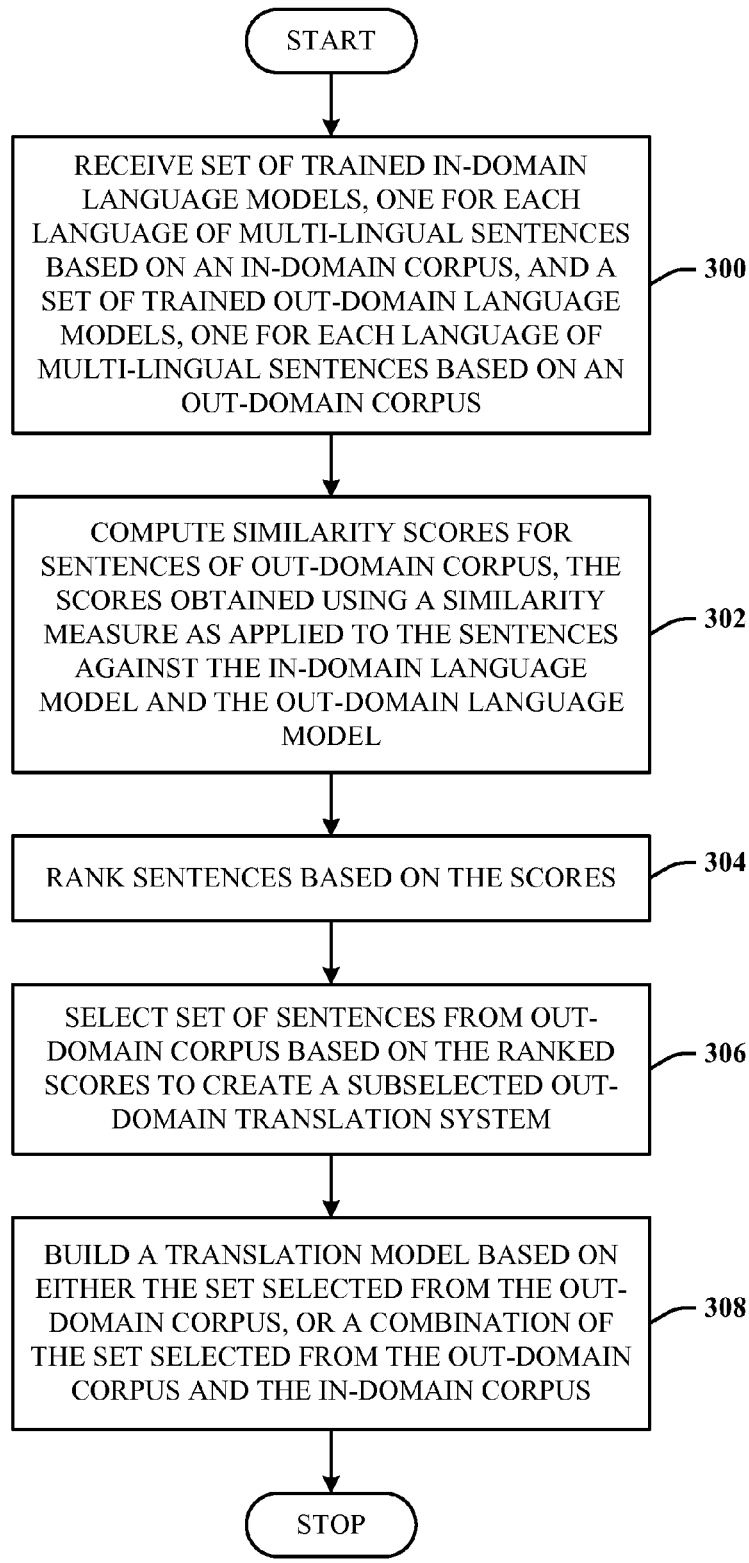
FIG. 3 illustrates a computer-implemented selection method in accordance with the disclosed architecture.

FIG. 3 illustrates a computer-implemented selection method in accordance with the disclosed architecture. At 300, a set of trained in-domain language models, one for each language of multi-lingual sentences based on an in-domain corpus is received, as well as a set of trained out-domain language models, one for each language of multi-lingual sentences based on an out-domain corpus is received. At 302, similarity scores are computed for sentences of the out-domain corpus, the scores obtained using a similarity measure as applied to the sentences against the in-domain language model and the out-domain language model. At 304, the sentences are ranked based on the scores. At 306, sentences are selected from the out-domain corpus based on the ranking scores. At 308, a translation model is built based on either the set selected from the out-domain corpus, or a combination of the set selected from the out-domain corpus and the in-domain corpus.

Figure 4:
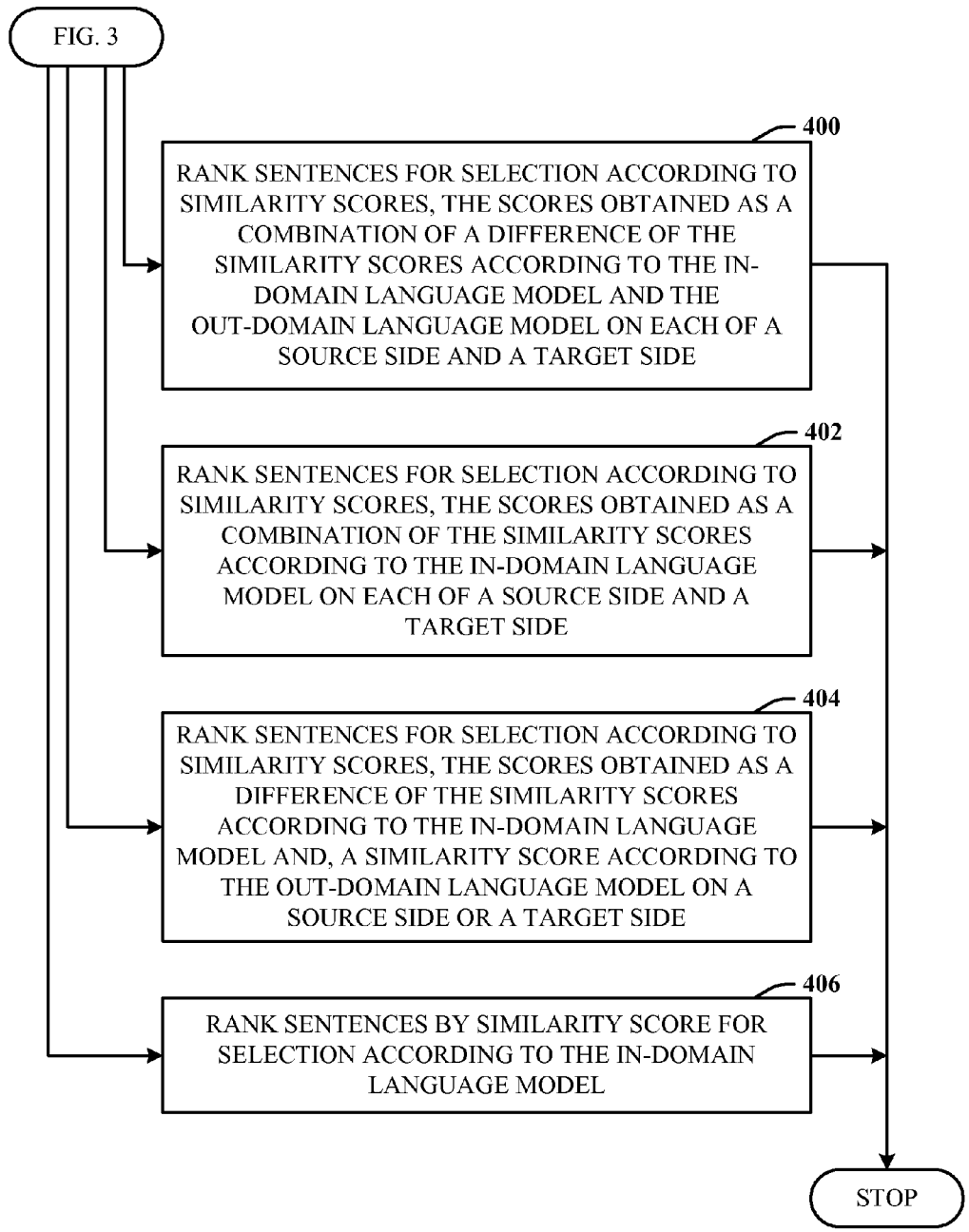
FIG. 4 illustrates further aspects of the method of FIG. 3.

FIG. 4 illustrates further aspects of the method of FIG. 3. Note that the flow indicates that each block can represent a step that can be included, separately or in combination with other blocks, as additional aspects of the method represented by the flow chart of FIG. 3. At 400, the sentences are ranked for selection according to similarity scores, the scores obtained as a combination of a difference of the similarity scores according to the in-domain language model and the out-domain language model on each of a source side and a target side. At 402, the sentences are ranked for selection according to similarity scores, the scores obtained as a combination of the similarity scores according to the in-domain language model on each of a source side and a target side. At 404, the sentences are ranked for selection according to similarity scores, the scores obtained as a difference of the similarity scores according to the in-domain language model and, a similarity score according to the out-domain language model on a source side or a target side. At 406, sentences are ranked by similarity score for selection according to only the in-domain language model.

Figure 5:
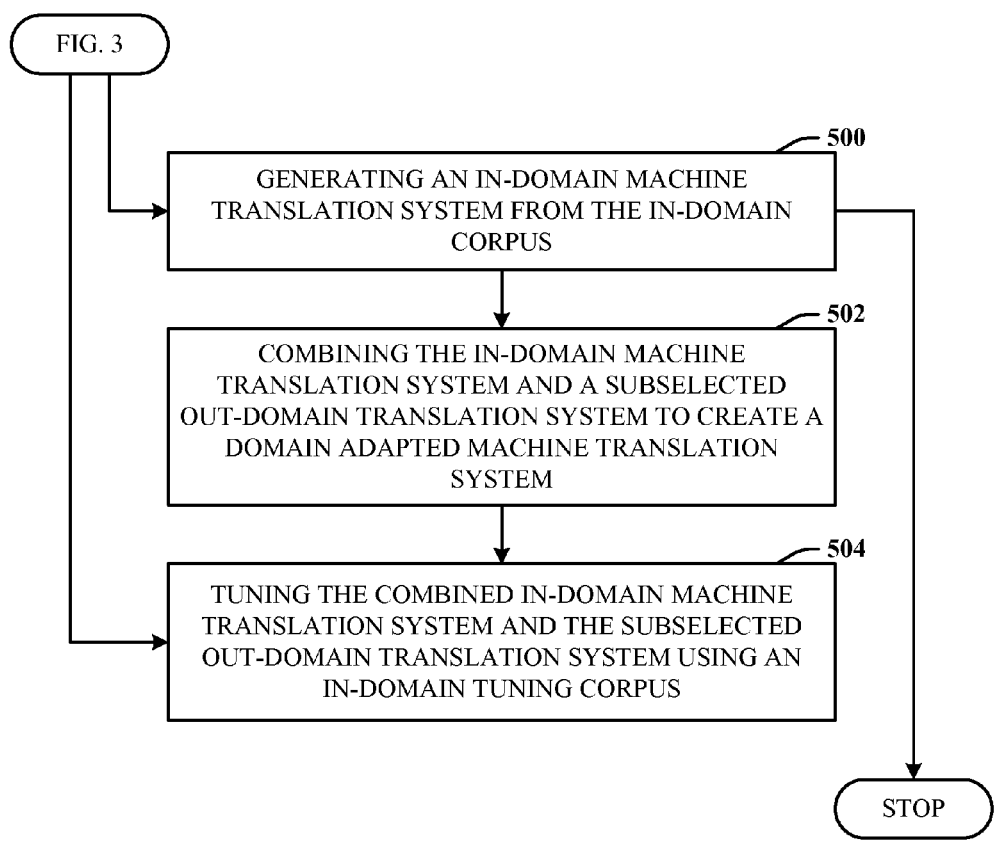
FIG. 5 illustrates further aspects of the method of FIG. 3.

FIG. 5 illustrates further aspects of the method of FIG. 3. Note that the flow indicates that each block can represent a step that can be included, separately or in combination with other blocks, as additional aspects of the method represented by the flow chart of FIG. 3. At 500, an in-domain machine translation system is generated from the in-domain corpus. At 502, the in-domain machine translation system and the sub-selected out-domain translation system are combined to create a domain adapted machine translation system. At 504, the combined in-domain machine translation system and a sub-selected out-domain translation system are tuned using an in-domain tuning corpus.

Figure 6:
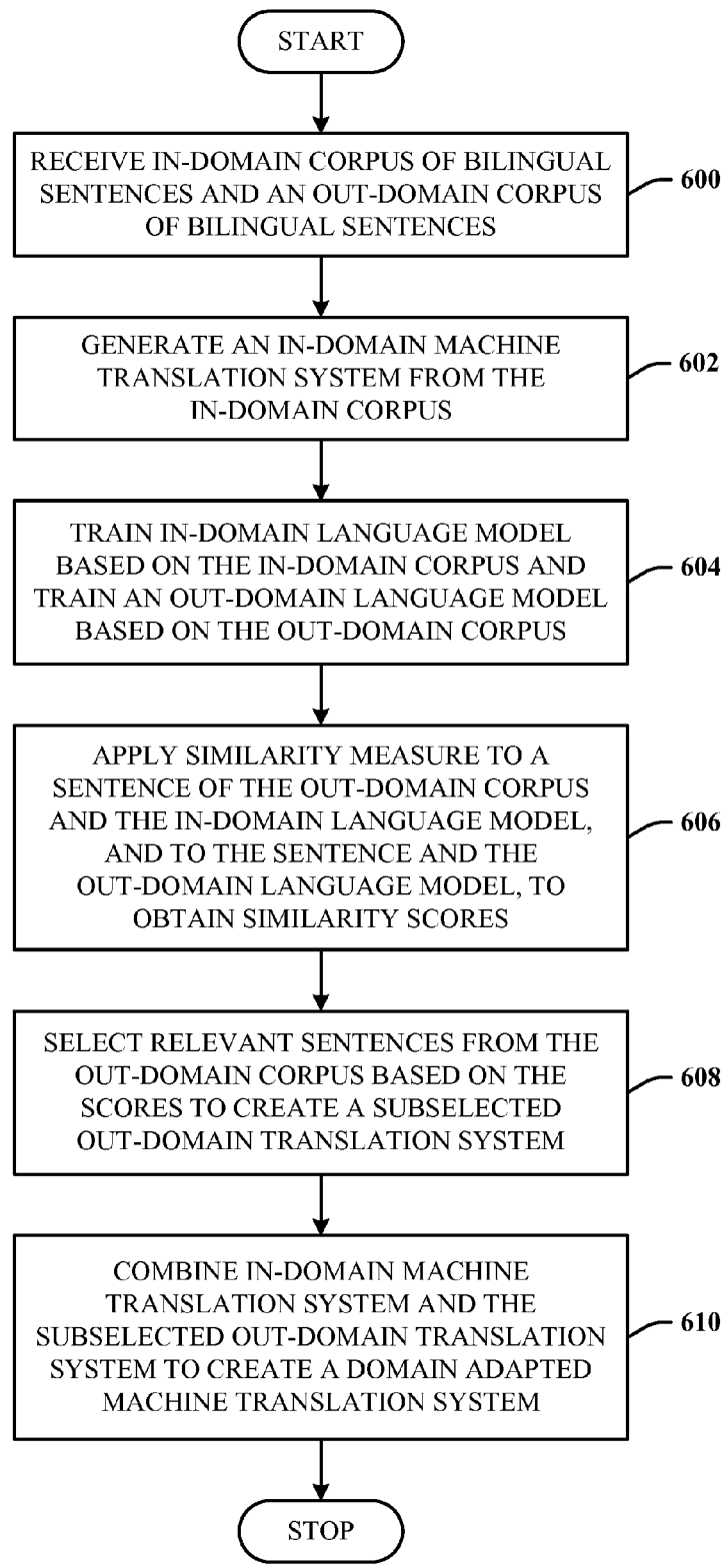
FIG. 6 illustrates an alternative computer-implemented selection method in accordance with the disclosed architecture.

FIG. 6 illustrates an alternative computer-implemented selection method in accordance with the disclosed architecture. At 600, an in-domain corpus of bilingual sentences and an out-domain corpus of bilingual sentences, are received. At 602, an in-domain machine translation system is generated from the in-domain corpus. At 604, an in-domain language model is trained based on the in-domain corpus and an out-domain language model is trained based on the out-domain corpus. At 606, a similarity measure is applied to a sentence of the out-domain corpus and the in-domain language model, and to the sentence and the out-domain language model, to obtain similarity scores. At 608, relevant sentences are selected from the out-domain corpus based on the scores to create a subselected out-domain translation system. At 610, the in-domain machine translation system and the subselected out-domain translation system are combined to create a domain adapted machine translation system.

Figure 7:
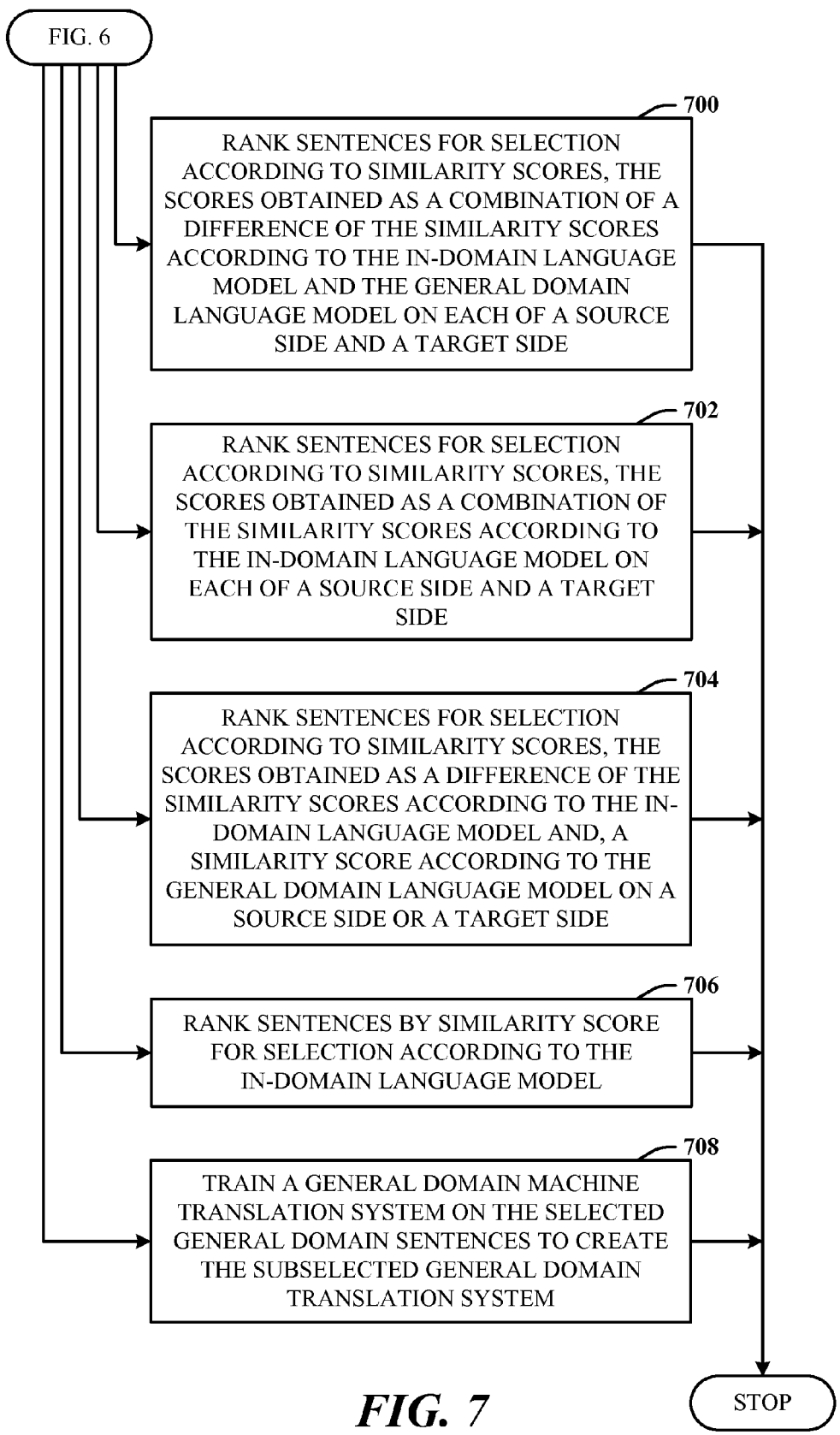
FIG. 7 illustrates further aspects of the method of FIG. 6.

FIG. 7 illustrates further aspects of the method of FIG. 6. Note that the flow indicates that each block can represent a step that can be included, separately or in combination with other blocks, as additional aspects of the method represented by the flow chart of FIG. 6. At 700, the sentences are ranked for selection according to similarity scores, the scores obtained as a combination of a difference of the similarity scores according to the in-domain language model and the out-domain language model on each of a source side and a target side. At 702, the sentences are ranked for selection according to similarity scores, the scores obtained as a combination of the similarity scores according to the in-domain language model on each of a source side and a target side. At 704, the sentences are ranked for selection according to similarity scores, the scores obtained as a difference of the similarity scores according to the in-domain language model and, a similarity score according to the out-domain language model on a source side or a target side. At 706, sentences are ranked by similarity score for selection according to the in-domain language model. At 708, an out-domain machine translation system is trained on the selected out-domain sentences to create the subselected out-domain translation system.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, a data structure (stored in volatile or non-volatile storage media), a module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 8:
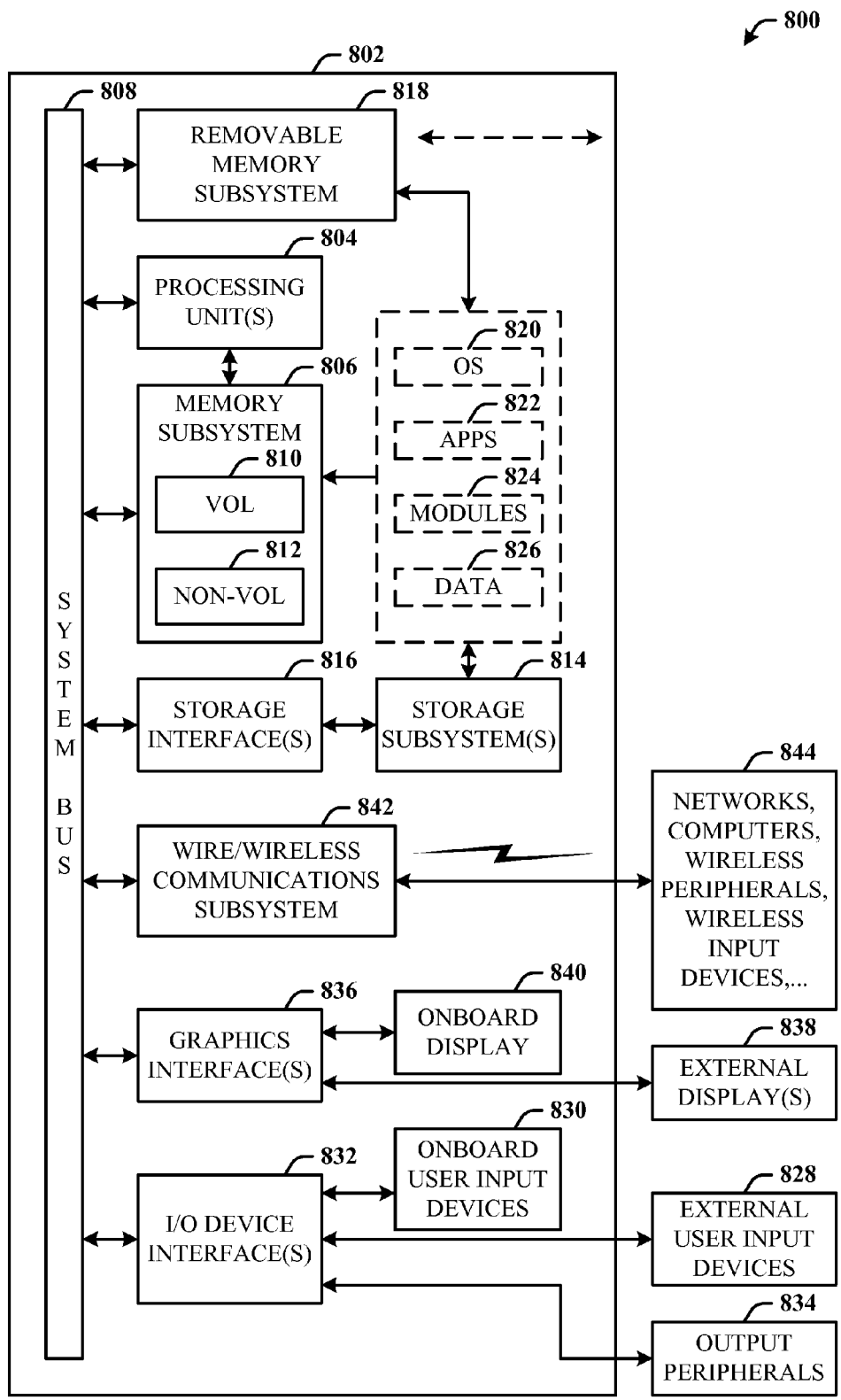
FIG. 8 illustrates a block diagram of a computing system that executes multi-lingual selection and creation of a domain adapted machine translation system in accordance with the disclosed architecture.

Referring now to FIG. 8, there is illustrated a block diagram of a computing system 800 that executes multi-lingual selection and creation of a domain adapted machine translation system in accordance with the disclosed architecture. In order to provide additional context for various aspects thereof, FIG. 8 and the following description are intended to provide a brief, general description of the suitable computing system 800 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 800 for implementing various aspects includes the computer 802 having processing unit(s) 804, a computer-readable storage such as a system memory 806, and a system bus 808. The processing unit(s) 804 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 806 can include computer-readable storage (physical storage media) such as a volatile (VOL) memory 810 (e.g., random access memory (RAM)) and non-volatile memory (NON-VOL) 812 (e.g., ROM, EPROM, EEPROM, etc.). A basic input/output system (BIOS) can be stored in the non-volatile memory 812, and includes the basic routines that facilitate the communication of data and signals between components within the computer 802, such as during startup. The volatile memory 810 can also include a high-speed RAM such as static RAM for caching data.

The system bus 808 provides an interface for system components including, but not limited to, the system memory 806 to the processing unit(s) 804. The system bus 808 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 802 further includes machine readable storage subsystem(s) 814 and storage interface(s) 816 for interfacing the storage subsystem(s) 814 to the system bus 808 and other desired computer components. The storage subsystem(s) 814 (physical storage media) can include one or more of a hard disk drive (HDD), a magnetic floppy disk drive (FDD), and/or optical disk storage drive (e.g., a CD-ROM drive DVD drive), for example. The storage interface(s) 816 can include interface technologies such as EIDE, ATA, SATA, and IEEE 1394, for example.

One or more programs and data can be stored in the memory subsystem 806, a machine readable and removable memory subsystem 818 (e.g., flash drive form factor technology), and/or the storage subsystem(s) 814 (e.g., optical, magnetic, solid state), including an operating system 820, one or more application programs 822, other program modules 824, and program data 826.

The operating system 820, one or more application programs 822, other program modules 824, and program data 826 can include the entities and components of the system 100 of FIG. 1, the entities and components of the diagram 200 of FIG. 2, and the methods represented by the flowcharts of FIGS. 3-7, for example.

Generally, programs include routines, methods, data structures, other software components, etc., that perform particular tasks or implement particular abstract data types. All or portions of the operating system 820, applications 822, modules 824, and/or data 826 can also be cached in memory such as the volatile memory 810, for example. It is to be appreciated that the disclosed architecture can be implemented with various commercially available operating systems or combinations of operating systems (e.g., as virtual machines).

The storage subsystem(s) 814 and memory subsystems (806 and 818) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 802 and includes volatile and non-volatile internal and/or external media that is removable or non-removable. For the computer 802, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 802, programs, and data using external user input devices 828 such as a keyboard and a mouse. Other external user input devices 828 can include a microphone, an IR (infrared) remote control, a joystick, a game pad, camera recognition systems, a stylus pen, touch screen, gesture systems (e.g., eye movement, head movement, etc.), and/or the like. The user can interact with the computer 802, programs, and data using onboard user input devices 830 such a touchpad, microphone, keyboard, etc., where the computer 802 is a portable computer, for example. These and other input devices are connected to the processing unit(s) 804 through input/output (I/O) device interface(s) 832 via the system bus 808, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 832 also facilitate the use of output peripherals 834 such as printers, audio devices, camera devices, and so on, such as a sound card and/or onboard audio processing capability.

One or more graphics interface(s) 836 (also commonly referred to as a graphics processing unit (GPU)) provide graphics and video signals between the computer 802 and external display(s) 838 (e.g., LCD, plasma) and/or onboard displays 840 (e.g., for portable computer). The graphics interface(s) 836 can also be manufactured as part of the computer system board.

The computer 802 can operate in a networked environment (e.g., IP-based) using logical connections via a wired/wireless communications subsystem 842 to one or more networks and/or other computers. The other computers can include workstations, servers, routers, personal computers, microprocessor-based entertainment appliances, peer devices or other common network nodes, and typically include many or all of the elements described relative to the computer 802. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 802 connects to the network via a wired/wireless communication subsystem 842 (e.g., a network interface adapter, onboard transceiver subsystem, etc.) to communicate with wired/wireless networks, wired/wireless printers, wired/wireless input devices 844, and so on. The computer 802 can include a modem or other means for establishing communications over the network. In a networked environment, programs and data relative to the computer 802 can be stored in the remote memory/storage device, as is associated with a distributed system. It will be appreciated that the network connections shown are exemplary and other means of establishing a communications link between the computers can be used.

The computer 802 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A computer-implemented selection system, comprising:
   linguistic data corpora that include an in-domain corpus and an out-domain corpus for domain adaptation for machine translation model training, the in-domain corpus and the out-domain corpus including multi-lingual data translated to the corpora in parallel;
   a relevance component that selects relevant multi-lingual data from the out-domain corpus based on a similarity measure, the similarity measure considering a difference of cross-entropy scores according to an in-domain language model and an out-domain language model, the relevant multi-lingual data utilized in combination with the in-domain corpus or in isolation without the in-domain corpus; and
   a processor that executes computer-executable instructions associated with at least the relevance component.

2. The system of claim 1, wherein the relevant multi-lingual data is selected based on the similarity measure that considers the difference of cross-entropy scores according to the in-domain language model and the out-domain language model on a source side and a target side.

3. The system of claim 1, wherein the relevant multi-lingual data is selected based on the similarity measure that combines cross-entropy scores according to the in-domain language model on each of a source side and a target side.

4. The system of claim 1, wherein the relevant multi-lingual data is selected based on the similarity measure that considers the difference of the cross-entropy score according to the in-domain language model and cross-entropy score according to the out-domain language model.

5. The system of claim 1, wherein the relevant multi-lingual data is selected based on the similarity measure that includes a cross-entropy score according to the in-domain language model on each of a source side and a target side.

6. The system of claim 1, wherein the multi-lingual data is sentences that are ranked based on the similarity measure for selection as the relevant multi-lingual data.

7. The system of claim 1, wherein the selection is based on ranking and scoring techniques that are applied to at least one of a source side language or a target side language, and bilingual sentence pairs are selected from the out-domain corpus.

8. A computer-implemented selection method, comprising acts of:
   receiving a set of trained in-domain language models, one for each language of multi-lingual sentences based on an in-domain corpus and a set of trained out-domain language models, one for each language of multi-lingual sentences based on an out-domain corpus;
   computing similarity scores for each of the sentences of the out-domain corpus, the scores obtained using a similarity measure as applied to the sentences against the in-domain language model and the out-domain language model;
   ranking the sentences based on the scores;
   selecting a set of sentences from the out-domain corpus based on the ranked scores;
   building a translation model based on either the set selected from the out-domain corpus, or a combination of the set selected from the out-domain corpus and the in-domain corpus; and
   utilizing a processor that executes instructions stored in memory to perform at least one of the acts of computing, ranking, selecting, or building.

9. The method of claim 8, further comprising ranking the sentences for selection according to similarity scores, the scores obtained as a combination of a difference of the similarity scores according to the in-domain language model and the out-domain language model on each of a source side and a target side.

10. The method of claim 8, further comprising ranking the sentences for selection according to similarity scores, the scores obtained as a combination of the similarity scores according to the in-domain language model on each of a source side and a target side.

11. The method of claim 8, further comprising ranking the sentences for selection according to similarity scores, the scores obtained as a difference of the similarity scores according to the in-domain language model and, a similarity score according to the out-domain language model on a source side or a target side.

12. The method of claim 8, further comprising ranking sentences by similarity score for selection according to the in-domain language model.

13. The method of claim 8, further comprising:
    generating an in-domain machine translation system from the in domain corpus; and
    combining the in-domain machine translation system and a subselected out-domain translation system to create a domain adapted machine translation system.

14. The method of claim 13, further comprising tuning the combined in-domain machine translation system and the subselected out-domain translation system using an in-domain tuning corpus.

15. A computer-implemented selection method, comprising acts of:
    receiving an in-domain corpus of bilingual sentences and an out-domain corpus of bilingual sentences;
    generating an in-domain machine translation system from the in-domain corpus;
    training an in-domain language model based on the in-domain corpus and training an out-domain language model based on the out-domain corpus;
    applying a similarity measure to a sentence of the out-domain corpus and the in-domain language model, and to the sentence and the out-domain language model, to obtain similarity scores;
    selecting relevant sentences from the out-domain corpus based on the scores to create a subselected out-domain translation system;
    combining the in-domain machine translation system and the subselected out-domain translation system to create a domain adapted machine translation system; and
    utilizing a processor that executes instructions stored in memory to perform at least one of the acts of generating, training, applying, selecting, or combining.

16. The method of claim 15, further comprising ranking the sentences for selection according to similarity scores, the scores obtained as a combination of a difference of the similarity scores according to the in-domain language model and the out-domain language model on each of a source side and a target side.

17. The method of claim 15, further comprising ranking the sentences for selection according to similarity scores, the scores obtained as a combination of the similarity scores according to the in-domain language model on each of a source side and a target side.

18. The method of claim 15, further comprising ranking the sentences for selection according to similarity scores, the scores obtained as a difference of the similarity scores according to the in-domain language model and, a similarity score according to the out-domain language model on a source side or a target side.

19. The method of claim 15, further comprising ranking sentences by similarity score for selection according to the in-domain language model.

20. The method of claim 15, further comprising training an out-domain machine translation system on the selected out-domain sentences to create the subselected out-domain translation system.

* * * * *